3,548,191
PLASTIC TRACK-TYPE DETECTOR FOR SLOW NEUTRONS HAVING THE NEUTRON CONVERSION SUBSTANCE UNIFORMLY DISPERSED THEREIN
Warner W. Schultz, Schenectady, and Stanley L. Jones, Scotia, N.Y., assignors to the United States of America as represented by the United States Atomic Energy Commission
Filed Mar. 13, 1969, Ser. No. 807,081
Int. Cl. G01t 3/00, 5/10
U.S. Cl. 250—83.1
10 Claims

ABSTRACT OF THE DISCLOSURE

This invention is a track-type detector for slow neutrons, comprising a substrate on which a track detector plastic is deposited, the plastic containing a uniform disperson of one of the following compounds: Tetraphenyl boron, hexamethyl borazine, lithium ricinoleate, carborane.

BACKGROUND OF THE INVENTION

This invention was made in the course of, or under a contract with the United States Atomic Energy Commission.

Boron and/or lithium have long been used to measure slow neutron fluxes in nuclear reactors. These elements are particularly suited to the measurement of slow neutrons because of their large $n$, $\alpha$ reaction cross sections, and because the absorption cross section is inversely proportional to the neutron velocity ($1/v$ law) in the neutron energy region from about 0.01 ev. to 0.1 mev.

DESCRIPTION OF THE PRIOR ART

In order to take advantage of this extended $1/v$ response of boron and lithium, proportional counters and ionization chambers have been made by filling them with a gas containing boron or lithium, or by coating one of the electrodes with boron or lithium. These devices are so al to alter the flux in the region of measurement. In addition the electrical lead to the device alters the neutron flux. Another type of detector that has been tried is a boron loaded emulsion of the photographic type. This is not suitable in even moderate reactor neutron fluxes because of response to beta and gamma radiation; the fogging of the emulsion by betas and gammas makes its impossible to count the alpha tracks produced by the $n$, $\alpha$ reaction with boron. By contrast, the dielectric track detector (also known in the art) is insensitive to even large fluxes of beta and gamma radiation. These detectors have been made by placing a layer of boron next to a dielectric track material such as cellulose nitrate. The difficulty with these has been in maintaining the boron layer at a uniform thickness, without which quantitative measurement of neutron flux is not possible.

SUMMARY OF THE INVENTION

It is accordingly an object of our invention to provide an accurate detector for slow neutrons, utilizing the properties of boron and/or lithium.

It is another object of our invention to provide such a detector which is insensitive to large fluxes of beta and gamma radiation.

A further object of our invention is to provide an accurate slow neutron detector having a range of neutron sensitivity of several decades.

To accomplish the above objects we have found that it is necessary to disperse a lithium or boron compound uniformly inside the dielectric material itself, and to make the compound remain so dispersed with the passage of time. Most boron and lithium compounds will not stay in solution. After drying of the film, a division into two or more phases occurs, not only spoiling the uniformity but also making it difficult or impossible to see the alpha particles' tracks in the optical microscope after the detector is etched. We have discovered that certain lithium and boron compounds can be used to overcome this difficulty. They are: tetraphenyl boron, hexamethyl borazine, lithium ricinoleate, and carborane.

In accordance with our invention we have provided a track-type detector containing a uniform suspension of one of the above mentioned materials within the detector, and a method of making such detectors.

DETAILED DESCRIPTION

In making the detector of our invention a track detecting material is dissolved in a solvent which will also dissolve the boron or lithium compound to be used. The resulting solution is then spread in a thin layer and the solvent is evaporated leaving a thin film which is ready for use as a neutron detector.

The track detecting material may be any substance meeting the following physical qualifications:

(1) The movement of alpha particles within the substance must produce defects which are capable of detection.

(2) The substance must be soluble in a liquid which will also dissolve the boron or lithium compound selected.

(3) The substance must be capable of forming a coherent film.

Our process of making our detector is described in detail in the following description of preparing a detector containing boron or lithium, wherein plasticized cellulose nitrate is the specific track detecting material.

The cellulose nitrate is dissolved in a mixture of 75% diethyl ether and 25% ethyl alcohol. Since collodion is such a solution, we have used it as the starting point. To this solution is added a plasticizer, dibutyl phthalate, in an amount equal to 20% by weight of total solids (cellulose nitrate+dibutyl phthalate.) The boron or lithium compound is then selected and added. We have discovered that any one of the following compounds is acceptable:

Sodium tetraphenyl boron, $NaB(C_6H_5)_4$, up to 0.5% by weight.
Hexamethyl borazine, $(CH_3NBCH_3)_3$, up to 1.0% by weight.
Lithium ricinoleate, $$CH_3(CH_2)_5CHOHCH_2CH=CH(CH_2)_7COO-Li,$$

up to 0.1% by weight.
Carborane, $C_2H_2B_{10}H_{10}$, up to 13.3% by weight.

The minimum amount of boron or lithium compound necessary for detection depends on the neutron dose received by the track detector. For a high neutron dose a detector containing a small amount of boron or lithium is desirable. We have made track detectors with as little as 0.01% boron.

The proportion of dibutyl phthalate can be varied over a wide range above and below 20% without degrading the track forming properties of the detector. We have also used camphor and castor oil as the plasticizer and found that they work. Other plasticizers commonly used with cellulose nitrate, such as tributyl phosphate, tricresyl phosphate and hydrogenated methyl abietate, may also be used.

The dissolved material prepared as above is poured onto a smooth flat surface such as a glass plate and dried. We have discovered that during the drying process it is essential that moisture be excluded. A simple method of meeting this requirement is to place the poured film in a desiccator with silica gel. A drying period of at least 10 hours is desirable to assure that the solvent has been removed from the film. The film can now be stripped off the glass plate and is ready for use. If a supporting backing is desired, the solution can be poured on a flat plastic sheet such as Lucite. Since Lucite is not attacked by the etching solution, the film and the Lucite remain attached during the etching process.

A conventional etching process is used to develop the tracks after exposure. The detector is immersed in 6 normal sodium hydroxide solution for approximately one hour at 25° C. The size of the tracks can be controlled by controlling the etching time and/or temperature, in a manner well known to persons skilled in the art.

The thickness of the detector is controlled by the amount of solvent used, i.e., to make thinner detectors use more solvent. The thickness of the detectors should be greater than the alpha particle range in the detector material. Since the alpha range in the track detector material is only a few microns, this is thick enough to record all of the tracks, but is too thin for ease of handling. We normally make the detectors from one to several mils thick. Neutron fluxes of up to three decades can be measured by the detectors of our invention by varying the boron or lithium content of the detector. Up to three more decades can be realized by varying track density. Thus our invention makes it possible to cover about six decades of neutron intensity.

EXAMPLE

Start with 50 grams of collodion. In this amount of collodion there are 2.62 grams of cellulose nitrate (pyroxylin). Into the collodion is dissolved 0.65 gram (20% by weight of total solids) of dibutyl phthalate and 0.04 gram of carborane, to form the track detector solution. The solution should be used within a few days after preparation.

The track detector solution is flowed onto the surface of a Lucite plate with a clean medicine dropper. The detector is then placed in an air flow apparatus in which the air flows through a micropore filter to remove particulate matter and silica gel to remove moisture. After drying the detector is ready to use.

After exposure the detector is etched in conventional manner and the alpha tracks are counted with an optical microscope.

We claim:
1. A detector for slow neutrons comprising at least one compound selected from the group consisting of tetraphenyl boron, hexamethyl borazine, lithium ricinoleate and carborane, uniformly dispersed in a plasticized track detector material.
2. A detector as defined by claim 1 wherein said compound is tetraphenyl boron.
3. A detector as defined by claim 1 wherein said compound is hexamethyl borazine.
4. A detector as defined by claim 1 wherein said compound is lithium ricinoleate.
5. A detector as defined by claim 1 wherein said compound is carborane.
6. A method of making the detector defined by claim 1, comprising the steps of:
   (a) forming a mixture of cellulose nitrate, diethyl ether, ethyl alcohol, a plasticizer and a compound selected from the group consisting of tetraphenyl boron, hexamethyl borazine, lithium ricinoleate and carborane.
   (b) pouring the mixture onto a flat surface to form a film; and
   (c) evaporating the diethyl ether and the ethyl alcohol from the film, the evaporation step being carried out in an anhydrous atmosphere.
7. The method as defined in claim 6, wherein the selected compound is tetraphenyl boron.
8. The method as defined in claim 6, wherein the selected compound is hexamethyl borazine.
9. The method as defined in claim 6, wherein the selected compound is lithium ricinoleate.
10. The method as defined in claim 6, wherein the selected compound is carborane.

References Cited
UNITED STATES PATENTS

| | | | |
|---|---|---|---|
| 3,415,993 | 12/1968 | Fleischer et al. | 250—83.1X |
| 3,457,408 | 7/1969 | Alter | 250—83.1 |
| 3,493,751 | 2/1970 | Davies et al. | 250—83.1X |

ARCHIE R. BORCHELT, Primary Examiner

U.S. Cl. X.R.

250—83; 252—408